United States Patent
Li

(10) Patent No.: US 9,841,868 B2
(45) Date of Patent: Dec. 12, 2017

(54) USER CONFIGURABLE USER INTERFACE

(71) Applicant: Panton Incorporated, Houston, TX (US)

(72) Inventor: Saishi F. Li, Sugar Land, TX (US)

(73) Assignee: PANTON, INC., Houston, TX (US)

( * ) Notice: Subject to any disclaimer, the term of this patent is extended or adjusted under 35 U.S.C. 154(b) by 302 days.

(21) Appl. No.: 14/527,514

(22) Filed: Oct. 29, 2014

(65) Prior Publication Data

US 2016/0124610 A1 May 5, 2016

(51) Int. Cl.
*G06F 3/0484* (2013.01)
*G06F 3/0481* (2013.01)
*G06F 9/44* (2006.01)

(52) U.S. Cl.
CPC ............... *G06F 3/0481* (2013.01); *G06F 8/38* (2013.01)

(58) Field of Classification Search
CPC ........ G06F 17/24; G06F 15/00; G06F 3/0484; G06F 3/0481
USPC ........................................................ 715/747
See application file for complete search history.

(56) References Cited

U.S. PATENT DOCUMENTS

| | | | |
|---|---|---|---|
| 7,337,411 B1* | 2/2008 | Racine | G06F 3/0483 715/762 |
| 2015/0378573 A1* | 12/2015 | Jansen op de Haar | G06Q 10/06 715/747 |

* cited by examiner

*Primary Examiner* — Andrea Leggett
(74) *Attorney, Agent, or Firm* — Patterson & Sheridan LLP

(57) ABSTRACT

Methods for providing a user with a user configurable user interface (UCUI) for a software application using an electronic computing device are presented, the methods including: causing the electronic computing device to receive a number of input fields corresponding with the UCUI from the software application; selecting any of the number of input fields for display on the UCUI; arranging the selected input fields by at least one group, where each of the selected input fields each correspond with at most one group at a time; arranging the at least one group for display on the UCUI; and displaying the UCUI, where the UCUI displays at least the at least one group and the corresponding selected input fields.

18 Claims, 6 Drawing Sheets

USER CONFIGURABLE USER INTERFACE

BACKGROUND

Computer software applications running on many types of computing systems—for example, a personal computer, a "smartphone," and any other type of device with a memory storing program instructions and a processor for executing those instructions—typically rely on graphic user interfaces (GUI) to allow for user interaction with the application. A GUI allows users to interact with an executing application through graphical elements, such as icons, text, and other visual indicators that are displayed to the user and that correspond to user commands. Selection of a graphical element by a mouse, for example, causes one or more processes to be performed by the computer under direction software programs by calling one or more functions or, in the case programs written in an object oriented language, methods. These functions are responsive to the user command represented by the graphical element. A GUI may be contrasted with a command line interface or shell, which requires that a user type in a command as a line of text, the shell takes the command and translates it to one or more functions that the application is called upon to perform.

Many conventional software applications provide limited customization of tool bars that may give access to a variety of software commands. However, these applications are generally limited and do not includes customization at the user level of other elements of the GUI in other applications, such as a database program, a user interface may be modified, but modification requires extensive knowledge of the underlying database program to make any changes. In database programs, changes to the interface may not generally be made on the fly by dragging and dropping fields by an individual user but generally require a developer or programmer. As such, user configurable user interfaces are presented herein.

SUMMARY

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented below.

Methods for providing a user with a user configurable user interface (UCUI) for a software application using an electronic computing device are presented, the methods including: causing the electronic computing device to receive a number of input fields corresponding with the UCUI from the software application; selecting any of the number of input fields for display on the UCUI; arranging the selected input fields by at least one group, where each of the selected input fields each correspond with at most one group at a time; arranging the at least one group for display on the UCUI; and displaying the UCUI, where the UCUI displays at least the at least one group and the corresponding selected input fields. In some embodiments, method further include moving all of the non-selected input fields to a retrievable archive, where the retrievable archive is available separately for each group. In some embodiments, an original UI in the software application is initially non-configurable. In some embodiments, method further include: entering an edit mode to edit the UCUI; editing any of the number of input fields by the user; and editing any of the at least one group by the user. In some embodiments, the editing any of the number of input fields by the user includes: adding one of the number of input fields to the UCUI, where adding one of the number of input fields to the UCUI includes, displaying the retrievable archive, selecting any of the non-selected input fields for display on the UCUI, and positioning the selected input field on the UCUI; deleting one of the displayed input fields on the UCUI, where deleting one of the displayed input fields on the UCUI includes, selecting one of the number of displayed input fields for deletion, moving the selected input field to the retrievable archive, and displaying the retrievable archive showing the deleted input field; and repositioning one of the displayed input fields on the UCUI, where repositioning one of the displayed input fields on the UCUI includes, selecting one of the number of displayed input fields for repositioning, and positioning the selected input field on the UCUI. In some embodiments, positioning the selected input field on the UCUI includes: dragging and dropping the selected input field to a desired location on the UCUI; if the desired location is atop a displayed input field, replacing the displayed input field with the selected input field and moving the displayed input field along side of the selected input field; if the desired location is atop a group header, positioning the selected input field to a first position in the group; if the desired location is outside a group, positioning the selected input field in a nearest group; and if the desired location is inside a group, positioning the selected input field in a last position in the group.

In some embodiments, the editing any of the at least one group includes: adding a new group, where adding a new group includes, naming the new group, and displaying the new group on the UCUI, repositioning one of the displayed groups on the UCUI, where repositioning one of the displayed groups on the UCUI includes, selecting a group bar of one of the displayed groups on the UCUI, and positioning the group bar on the UCUI; changing a group name, where changing a group name includes, selecting a group name of one of the displayed groups, and entering a new group name; deleting one of the displayed groups, where deleting one of the displayed groups includes, selecting one of the displayed groups, and deleting the one of the displayed groups, where deleting the one of the displayed groups returns any input fields corresponding with the deleted group to the retrievable archive; and changing a group color, where changing the group color includes, selecting one of the displayed groups, selecting a color for the one of the displayed groups, and applying the color for the one of the displayed groups. In some embodiments, when the user configures the UCUI, a configuration is stored, and where any of a number of configurations may be stored.

In other embodiments, computer device program products for providing a user with a user configurable user interface (UCUI) for a software application using an electronic computing device are presented, the computer device program products including: a non-transitory computer readable medium; first programmatic instructions for causing the electronic computing device to receive a number of input fields corresponding with the UCUI from the software application; second programmatic instructions for selecting any of the number of input fields for display on the UCUI; third programmatic instructions for arranging the selected input fields by at least one group, where each of the selected input fields each correspond with at most one group at a time; fourth programmatic instructions for arranging the at least one group for display on the and fifth programmatic instructions for displaying the UCUI, where the UCUI displays at least the at least one group and the corresponding selected input fields, where the programmatic instructions are stored on the non-transitory computer readable medium. In some embodiments, computer device program products further include: sixth programmatic instructions for moving all of the non-selected input fields to a retrievable archive, where the retrievable archive is available separately for each group.

In some embodiments, computer device program products further include: seventh programmatic instructions for entering an edit mode to edit the UCUI; eighth programmatic instructions for editing any of the number of input fields by the user; and ninth programmatic instructions for editing any of the at least one group by the user. In some embodiments, the eighth programmatic instructions for editing any of the number of input fields by the user includes: adding one of the number of input fields to the UCUI, where adding one of the number of input fields to the UCUI includes, displaying the retrievable archive, selecting any of the non-selected input fields for display on the UCUI and positioning the selected input field on the UCUI; deleting one of the displayed input fields on the UCUI, where deleting one of the displayed input fields on the UCUI includes, selecting one of the number of displayed input fields for deletion, moving the selected input field to the retrievable archive, and displaying the retrievable archive showing the deleted input field; and repositioning one of the displayed input fields on the UCUI, where repositioning one of the displayed input fields on the UCUI includes, selecting one of the number of displayed input fields for repositioning, and positioning the selected input field on the UCUI. In some embodiments, positioning the selected input field on the UCUI includes: dragging and dropping the selected input field to a desired location on the UCUI; if the desired location is atop a displayed input field, replacing the displayed input field with the selected input field and moving the displayed input field along side of the selected input field; if the desired location is atop a group header, positioning the selected input field to a first position in the group; if the desired location is outside a group, positioning the selected input field in a nearest group; and if the desired location is inside a group, positioning the selected input field in a last position in the group.

In some embodiments, the ninth programmatic instructions for editing any of the at least one group includes: adding a new group, where adding a new group includes, naming the new group, and displaying the new group on the UCUI; repositioning one of the displayed groups on the UCUI, where repositioning one of the displayed groups on the UCUI includes, selecting a group bar of one of the displayed groups on the UCUI, and positioning the group bar on the UCUI; changing a group name, where changing a group name includes, selecting a group name of one of the displayed groups, and entering a new group name deleting one of the displayed groups, where deleting one of the displayed groups includes, selecting one of the displayed groups, and deleting the one of the displayed groups, where deleting the one of the displayed groups returns any input fields corresponding with the deleted group to the retrievable archive; and changing a group color, where changing the group color includes, selecting one of the displayed groups, selecting a color for the one of the displayed groups, and applying the color for the one of the displayed groups. In some embodiments, computer device program products further include: when the user configures the UCUI, a configuration is stored, and where any of a number of configurations may be stored.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Various embodiments are described hereinbelow, including methods and techniques. It should be kept in mind that the invention might also cover articles of manufacture that includes a computer readable medium on which computer-readable instructions for carrying out embodiments of the inventive technique are stored. The computer readable medium may include, for example, semiconductor, magnetic, opto-magnetic, optical, or other forms of computer readable medium for storing computer readable code. Further, the invention may also cover apparatuses for practicing embodiments of the invention. Such apparatus may include circuits, dedicated and/or programmable, to carry out tasks pertaining to embodiments of the invention. Examples of such apparatus include a general-purpose computer and/or a dedicated computing device when appropriately programmed and may include a combination of a computer/computing device and dedicated/programmable circuits adapted for the various tasks pertaining to embodiments of the invention. Other examples include mobile computing devices and associated mobile applications pertaining to embodiments of the invention. Some examples include, but are not limited to smart phones, tablets, personal desk assistants, and mobile watches.

Figure 1:
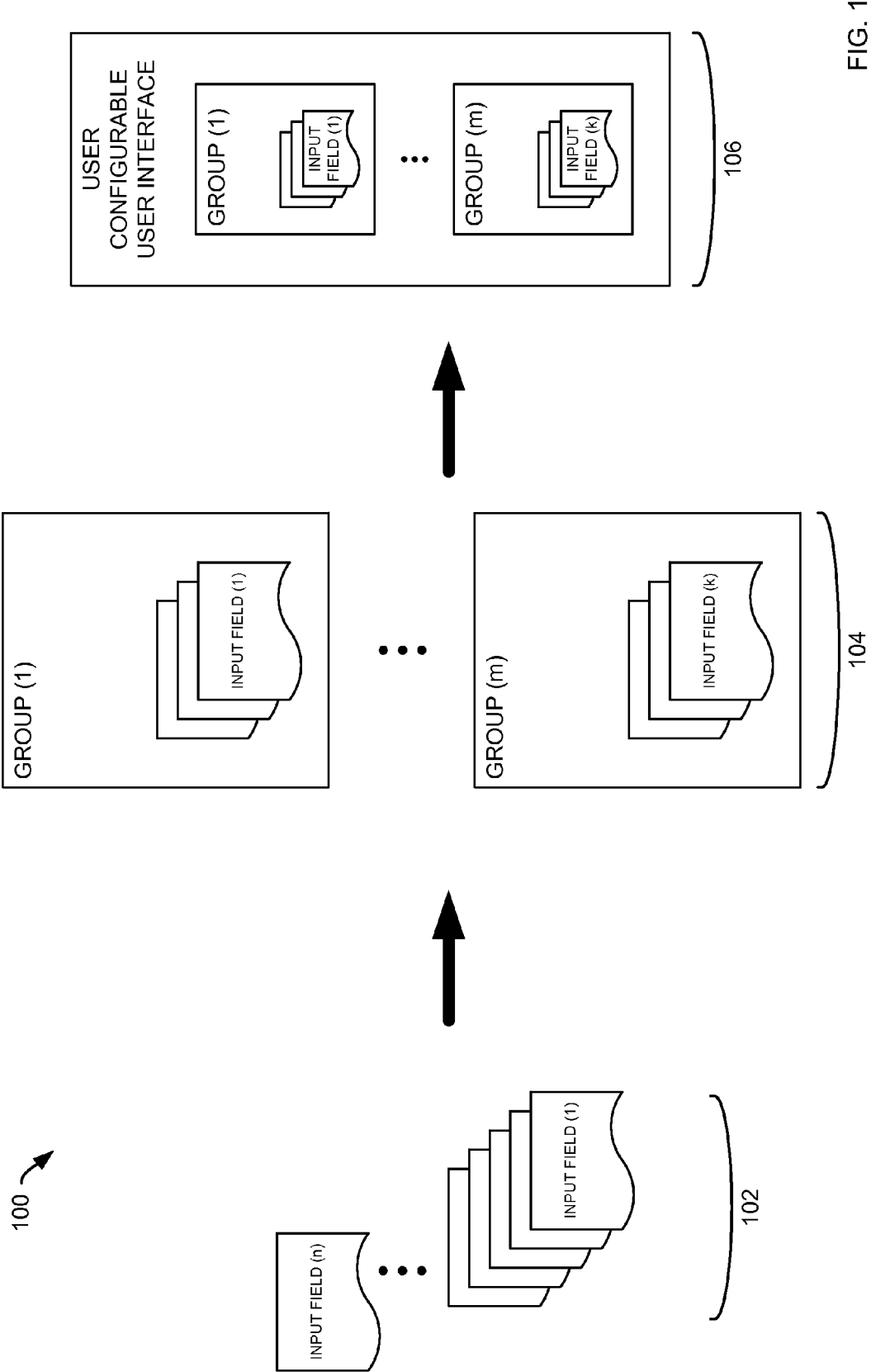
FIG. 1 is an illustrative representation of a user configurable user interface (UCUI) overview in accordance with embodiments of the present invention.

FIG. 1 is an illustrative representation of a user configurable user interface UCUI) overview 100 in accordance with embodiments of the present invention. Embodiments disclosed herein provide for a user configurable user interface where the user is given significant flexibility to customize the graphical user interface (GUI) according to the user's preference as to the various input fields, sub fields, layout out and color, by being able to arrange through a drag and drop interface, which enables the user to move, delete, add customized fields and to archive fields to be retrieved at a later time. In embodiments, a software provider whose software is enabled with the UCUI need not reprogram new GUIs for each user/client nor inform client that user interface elements like fields, display order, and color of the GUI is preset and cannot be altered (at least at the user level). Furthermore, settings corresponding with a UCUI enabled software may be saved for the individual user so that a user may transport settings to another terminal or platform also utilizing UCUI enabled software embodiments so that the user's interface is consistently utilized. In addition, UCUI may reorganize a group and all its elements in a new location intuitively. As illustrated, any number of input fields 102 may be included in a software application. An input field may be defined as any field capable of receiving input from users or other automated sources. Input fields 102 may be organized into any number of groups 104. An organization scheme may be selected to conform to a user's preferences. For example, any number of input fields related to company information may be organized into a group named "company." In some embodiments, an input field may only belong to one group at a time. In other embodiments an input field may belong to more than one group at a time. Groups, then become an organizing factor for UCUI 106 such that any group and all its included elements may be arranged in the UCUI in any fashion without limitation.

Figure 2:
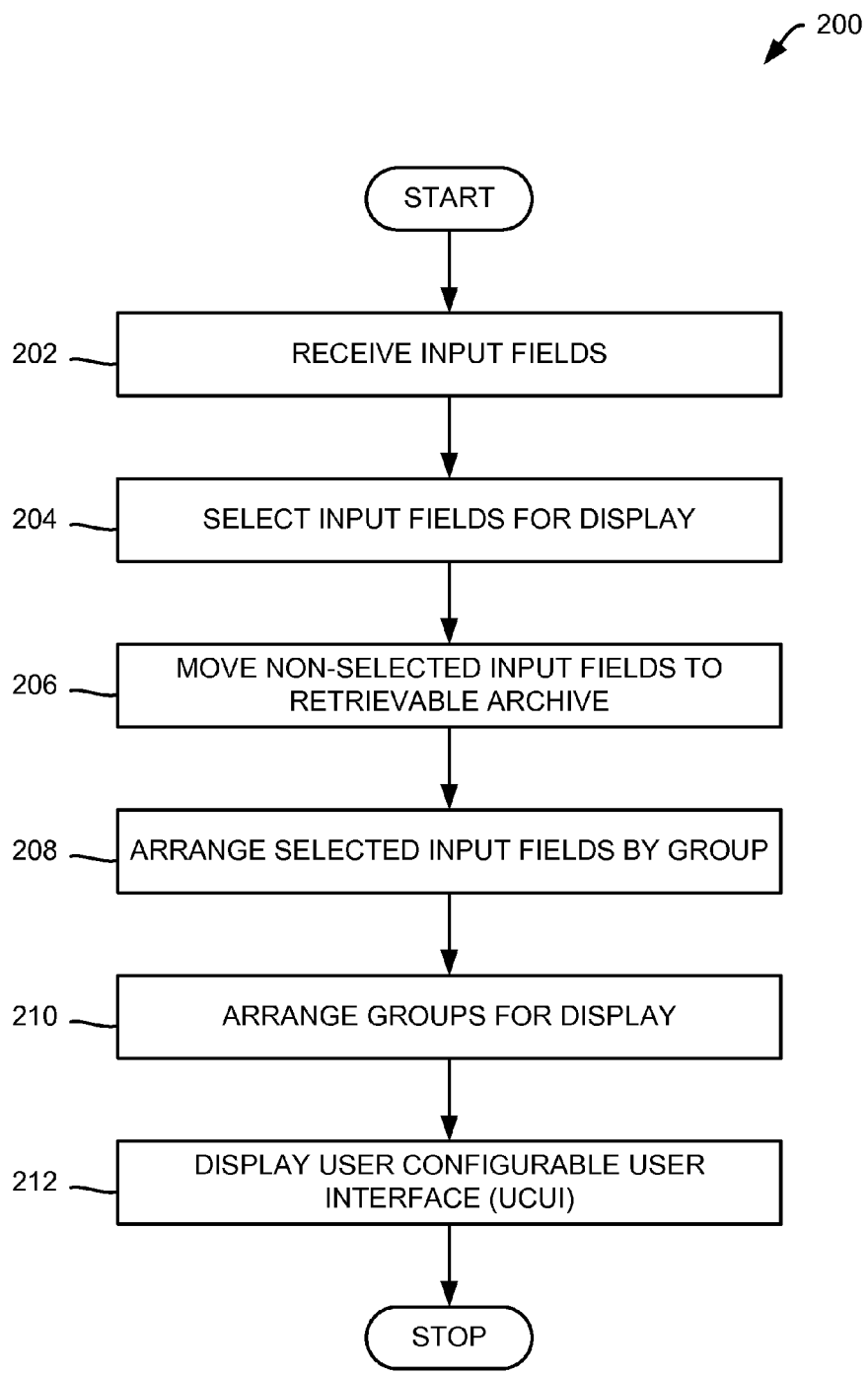
FIG. 2 is an illustrative flowchart of a method for providing a UCUI in accordance with embodiments of the present invention.

FIG. 2 is an illustrative flowchart 200 of a method for providing a UCUI in accordance with embodiments of the present invention. Methods disclosed herein may be useful in providing a UCUI for a software application. In some embodiments, an original user interface (UI) in a software application is initially non-configurable. As such, methods may provide a configurable UI. In other embodiments, an original UI in a software application is initially partially configurable. As such, methods may provide additional configurability. In addition, in embodiments, software applications may include any number of applications without limitation such as, database application, a word processing application, an enterprise application, a customer relationship management (CRM) application, a spreadsheet application, information worker application, educational application, a simulation application, an application suite, a product development application, and an engineering application.

As illustrated, at a step 202, the method receives any number of input fields from a software application. As noted above input fields are fields in the software application that are capable of receiving, input. Input may be received to an input field from any source without limitation. For example, in an embodiment, input may be provided by an individual user. In another embodiment, input may be provided automatically through a linked source. At a next step 204, the method selects any or all of the received input fields for display on the UCUI. In embodiments, a user may select the received input fields for display. In other embodiments, a pre-configured setting may provide for selecting the received input fields for display. If there are any non-selected input fields, the methods moves the non-selected input fields to a retrievable archive at a step 206. A retrievable archive includes all input fields that are not currently displayed. In embodiments, retrievable archives may be available to each group separately.

At a next step 208, the method arranges selected input fields by group. That is, the input fields selected for display are each placed in a group. In embodiments, an input field may only be placed in one group at a time and displayed only once on a UCUI. In other words, each of the selected, input fields each correspond with at most one group at a time. In other embodiments, an input field may be displayed more than once on a UCUI. As noted above, input fields may be organized into any number of groups. An organization scheme may be selected to conform to a user's preferences. For example, a number of input fields related to company information may be organized into a group named "company." Thus related input fields may be localized in a specific area on the UCUI. In another example, input fields may be randomly assigned to any number of groups. At a next step 210, the method arranges groups for display on the UCUI. Groups may be arranged by a user, automatically by predefined arrangement rules, or both without limitation. At a next step 212, the method displays the UCUI that includes displayed groups of displayed input fields. Displaying a UCUI may include one or more pages depending on display configurations.

Figure 3:
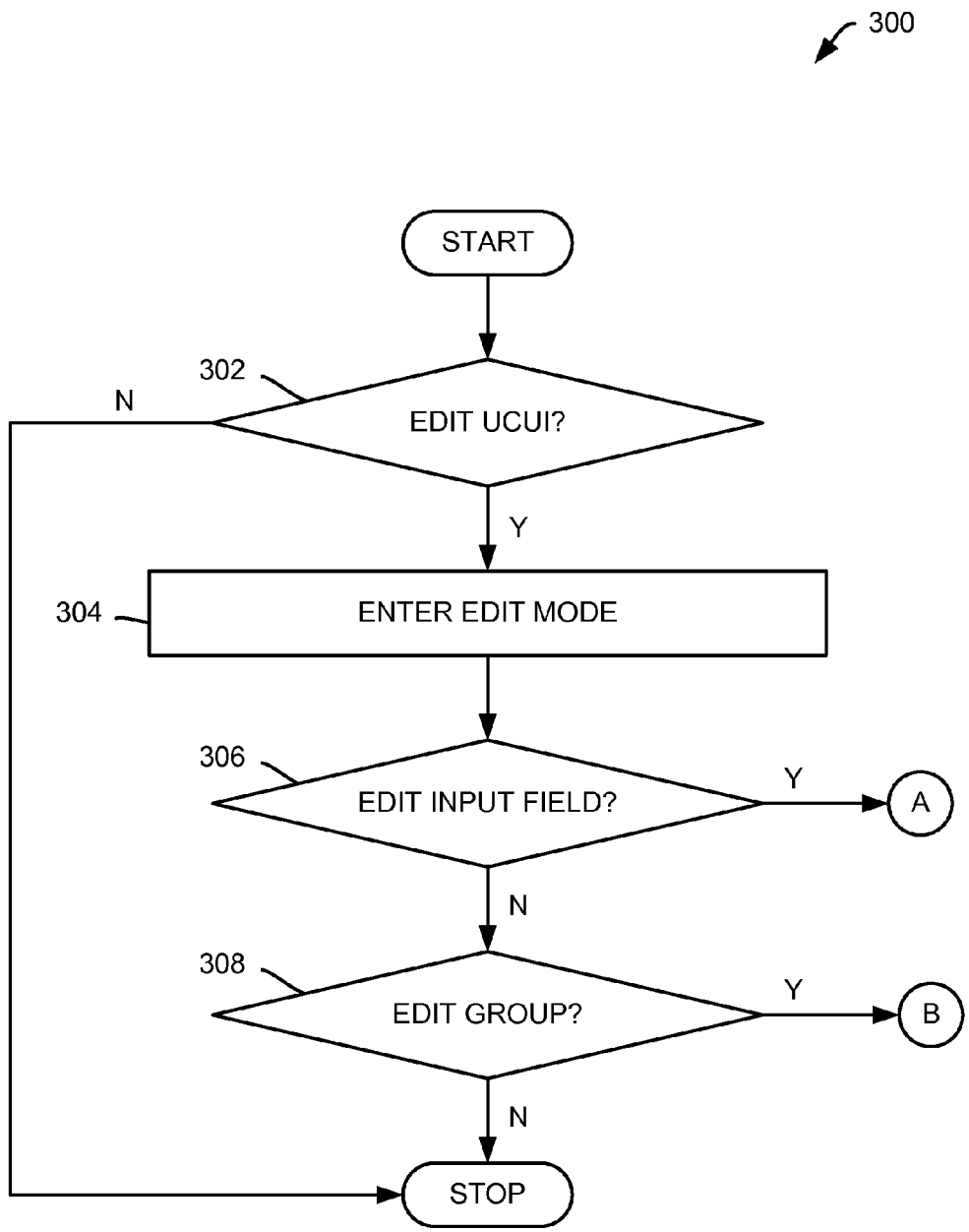
FIG. 3 is an illustrative flowchart of a method for providing an edit mode in a UCUI in accordance with embodiments of the present invention.

FIG. 3 is an illustrative flowchart 300 of a method for providing an edit mode in a UCUI in accordance with embodiments of the present invention. At a first step 302, the method determines whether to edit the UCUI. If the method determines at a step 302 not to edit the UCUI, the method ends. If the method determines at a step 302 to edit the UCUI, the method continues to a step 304 to enter an edit mode. A determination to edit the UCUI may be made in response to a user selecting an edit icon, entering a key code, or entering a mouse click. Indeed any number of user initiated actions may be utilized to enter an edit mode for the UCUI. Once the method has entered an edit mode, the method determines at a step 306 whether to edit, an input field. A determination of whether to edit an input field may be made, in some embodiments, by simply selecting an input field while in edit mode. If the method determines at a step 306 to edit an input field, the method proceeds to methods described below for FIG. 4. If the method determines at a step 306 not to edit an input field, the method continues to a step 308 to determine whether to edit a group. Determination of whether to edit a group may be made, in some embodiments, by simply a group or group bar while in edit mode. If the method determines at a step 308 to edit a group, the method proceeds to methods described below for FIGS. 5 and 6. If the method determines at a step 308 not to edit group, the method ends.

Figure 4:
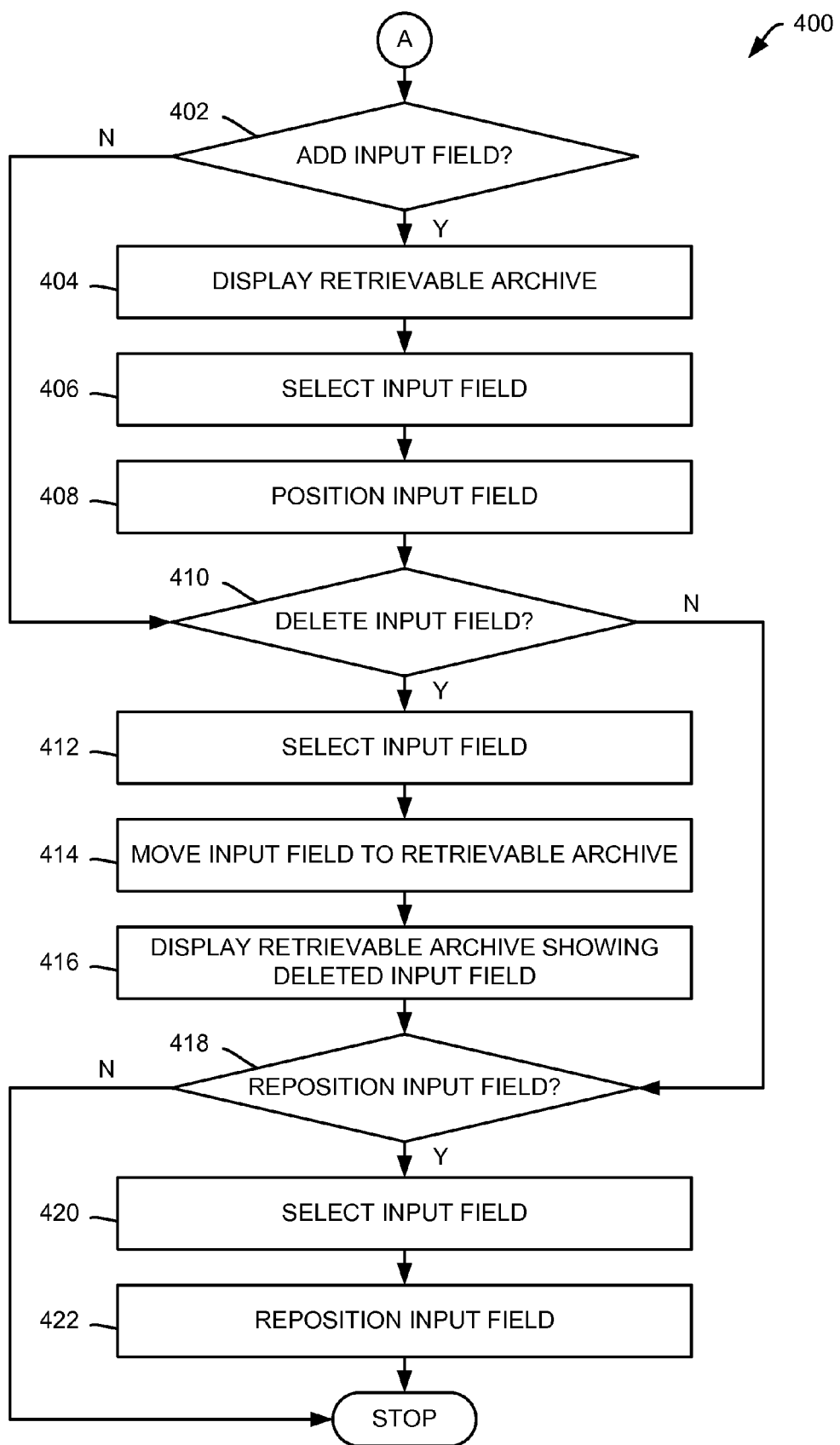
FIG. 4 is an illustrative flowchart of a method editing an input field in a UCUI in accordance with embodiments of the present invention.

FIG. 4 is an illustrative flowchart of 400 a method editing an input field in a UCUI in accordance with embodiments of the present invention. In particular, flowchart 400 proceeds from a step 306, FIG. 3. In embodiments, there are at least three ways in which an input field may be edited namely: adding an input field; deleting an input field; and repositioning an input field. At a first step 402, the method determines whether to add an input field for display on the UCUI. Any number of input fields may be added for display up to the number of input fields received as in at a step 202. FIG. 2. If the method determines at a step 402 not to add an input field to display to the UCUI, the method continues to a step 410. If the method determines at a step 402 to add an input field to display to the UCUI, the method continues to a step 404 to display a retrievable archive. In embodiments, retrievable archives display all input fields that were previously non-selected for display. At a next step 406, the method continues to select any of the previously non-selected input fields in the retrievable archive for display on the UCUI. As such, a user may select any input field in the retrievable archive to be positioned in any group currently displayed on the UCUI.

At a next step 408, the method positions the selected input field on the UCUI. In some embodiments, the input field may be positioned by dragging and dropping the input field on the UCUI by a user. In other embodiments, the input field may be positioned by pre-configured parameters. In still other embodiments, the input field may be positioned by a combination of dragging and dropping as well as by pre-configured parameters. For example, if the desired location is atop a displayed input field, the displayed input field may be replaced by the selected input field and moved along side of the selected input field: if the desired location is atop a group header, the selected input field may be positioned to a first position in the group; if the desired location is outside a group, the selected input field may be positioned in a group nearest to the desired location; and if the desired location is inside a group, the selected input field may be positioned in a last position in the group.

At a next step 410, the method determines whether to delete an input fields on the UCUI. If the method determines at a step 410 not to delete an input fields on the UCUI, the method continues to a step 418. If the method determines at a step 410 to delete an input field on the UCUI, the method continues to a step 412 to select any of the input fields displayed on the UCUI for deletion. In embodiments, selection of a displayed input field may be made by a user. At a next step 414, the method continues to move the input field selected for deletion into the retrievable archive, whereupon the input field selected for deletion is displayed in the retrievable archive at a step 416. As may be appreciated, deleted input fields are fields that are removed from the UCUI. However, all input fields remain accessible to a user either on the UCUI or in the retrievable archive.

The method continues to a step 418 to determine whether to reposition any of the input fields displayed on the UCUI. If the method determines at a step 418 not to reposition any of the input fields displayed on the UCUI, the method ends. If the method determines at a step 418 to reposition any of the input fields displayed on the UCUI, the method continues to a step 420 to select an input field for repositioning. At a next step 422, the method reposition the selected input field on the UCUI. As above, in some embodiments, the input may be is positioned by dragging and dropping the input field on the UCUI. In other embodiments, the input field may be positioned by a combination of dragging and dropping as well as by pre-configured parameters. For example, if the desired location is atop a displayed input field, the displayed input field may be replaced with the selected input field and moved along side of the selected input field; if the desired location is atop a group header, the selected input field may be positioned to a first position in the group; if the desired location is outside a group, the selected input field may be positioned in a group nearest to the desired location: and if the desired location is inside a group, the selected input field may be positioned in a last position in the group. The method then ends.

Figure 5:
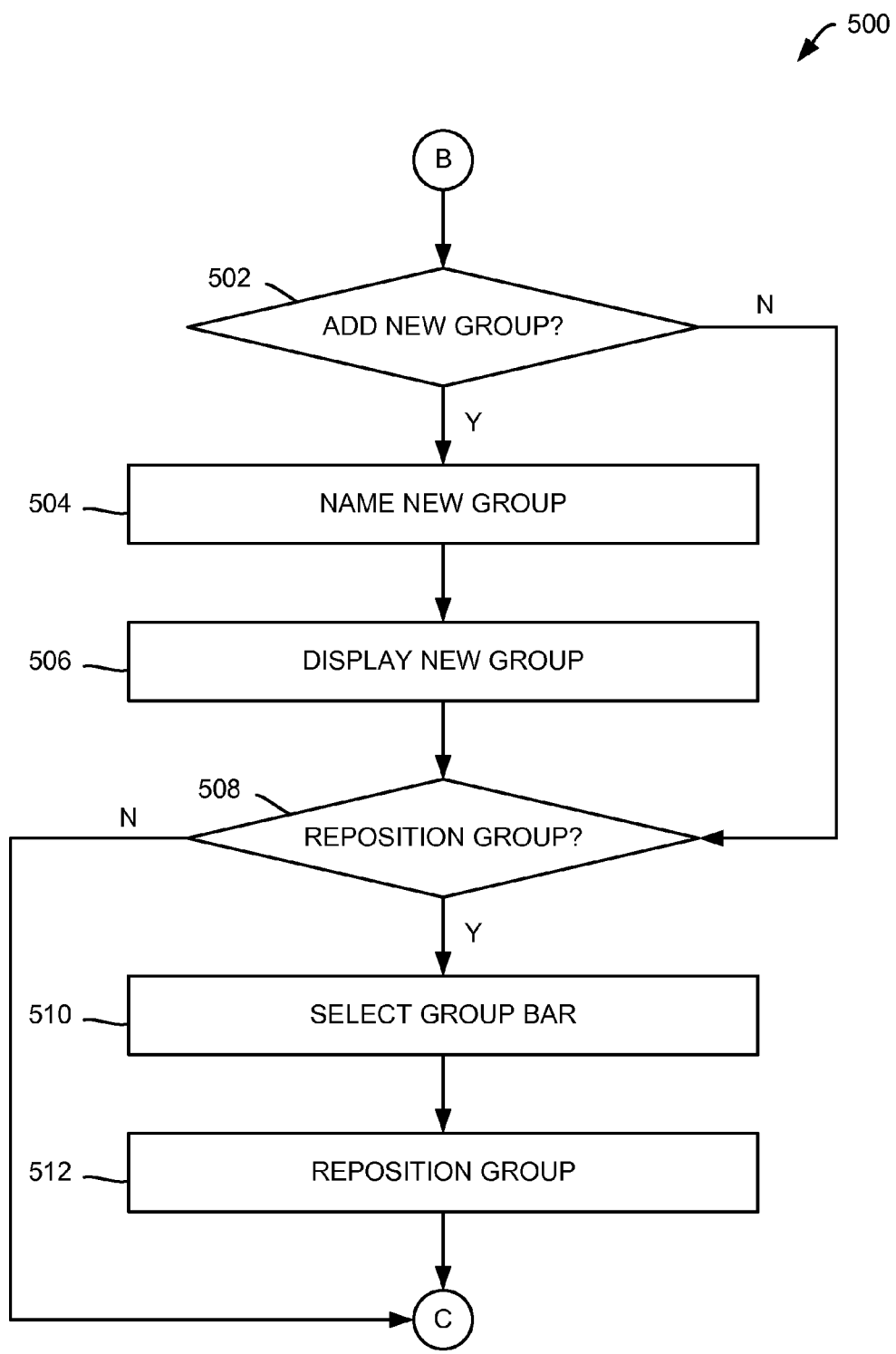
FIG. 5 is an illustrative flowchart of a method for editing a group in a UCUI in accordance with embodiments of the present invention.
Figure 6:
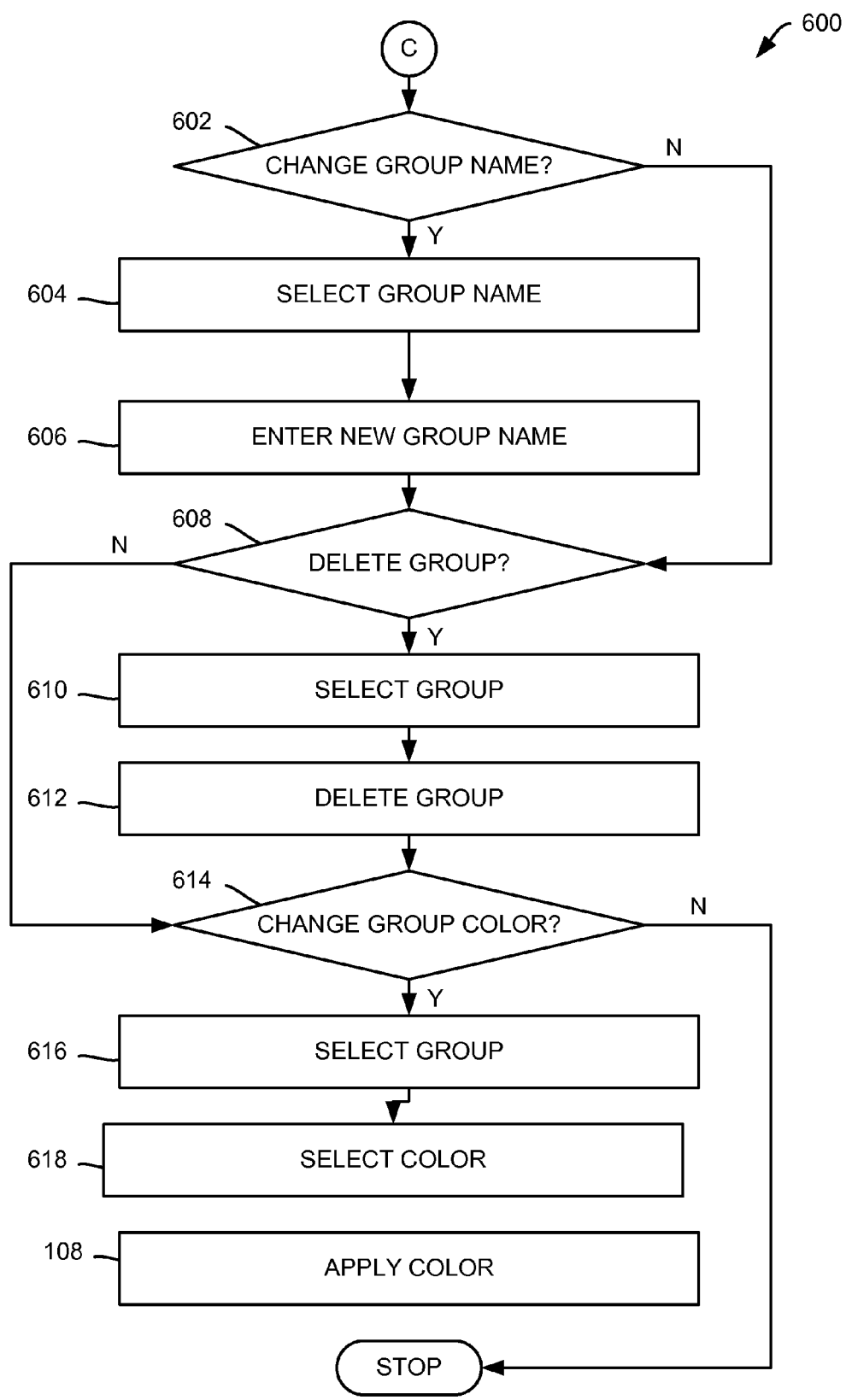
FIG. 6 is an illustrative flowchart of a method for editing a group in a UCUI in accordance with embodiments of the present invention.

FIGS. 5 and 6 are illustrative flowcharts 500 and 600 of a method for editing a group in a UCUI in accordance with embodiments of the present invention. In particular, flowchart 500 proceeds from a step 308, FIG. 3 and flowchart 6 proceeds from a step 512, FIG. 5. In embodiments, there are at least five ways in which a group may be edited namely: adding a new group; repositioning a group; changing a group name, deleting, a group, and changing a group color. Referring first to FIG. 5, at a first step 502, the method determines whether to add a new group. If the method determines at a step 502 not to add a new group, the method continues to a step 508. If the method determines at a step 502 to add a new group, the method continues to a step 504 to name the new group. Any name or naming convention known in the art may be utilized without departing from embodiments disclosed herein. At a next step 506, the method displays the new group on the UCUI.

At a next step 508, the method determines whether to reposition a group. If the method determines at a step 508 not to reposition a group, the method continues to a step 602, FIG. 6. If the method determines at a step 502 to reposition a group, the method continues to a step 510 to select a group bar. A group bar is a bar that extends across the top of a group on the UCUI. Group bars may be sized and colored in accordance with a user's preferences. The method continues to a step 512 to reposition the group. As such, a user may drag and drop the group bar to any position on the UCUI for repositioning the group. By using the group bar to reposition the group, the user may more easily identify which group is being moved.

Referring to FIG. 6, the method continues to a step 602 the method determines whether to change a group name. If the method determines at a step 602 not to change a group name, the method continues to a step 608. If the method determines at a step 602 to change a group name, the method continues to a step 604 to select a group displayed on the UCUI. At a next step 606, the method continues to enter a new group name. As above, any name or naming convention known in the art may be utilized without departing from embodiments disclosed herein. At a next step 608, the method determines whether to delete a group. If the method determines at a step 608 not to delete a group, the method continues to a step 614. If the method determines at a step 608 to delete a group, the method continues to a step 610 to select a group displayed on the UCUI, whereupon the group is deleted at a step 612. When a group is deleted from the UCUI, the input fields corresponding with the deleted group are returned to the retrievable archive. As such, input fields are never irretrievably deleted or lost. Rather, input fields are either displayed on the UCUI or in the retrievable archive.

At a next step 614, the method determines whether to change a group color. If the method determines at a step 614 not change a group color, the method ends. If the method determines at a step 614 to change a group color, the method continues to a step 618 to select a group displayed on the UCUI. At a next step 618, the method continues to select a color. As such a user may select a color for the selected group. Color selection may proceed from a color palette or a pre-defined list of colors without limitation and without departing from embodiments disclosed herein. At a next step 620, the method applies the selected color to the selected group, whereupon the method ends. Any changes made to the UCUI ma be stored in a configuration file and may be made available to a user at any location. Thus, for example, a user accessing any terminal at an enterprise location may be assured a consistent interface with which to work. In addition users may utilize each others' configuration files without limitation so that a useful configuration may be distributed more easily. As may be appreciated, any number of users may have any number of configurations without departing from embodiments provided herein.

While this invention has been described in terms of several embodiments, there are alterations, permutations, and equivalents, which fall within the scope of this invention. It should also be noted that there are many alternative ways of implementing the methods and apparatuses of the present invention. Furthermore, unless explicitly stated, any method embodiments described herein are not constrained to a particular order or sequence. Further, the Abstract is provided herein for convenience and should not be employed to construe or limit the overall invention, which is expressed in the claims. It is therefore intended that the following appended claims be interpreted as including all such alterations, permutations, and equivalents as fall within the true spirit and scope of the present invention.

What is claimed is:

1. A method for providing a user with a user configurable user interface (UCUI) for a software application using an electronic computing device, the method comprising:
   causing the electronic computing device to receive a plurality of input fields corresponding with the UCUI from the software application;
   selecting any of the plurality of input fields for display on the UCUI;
   moving all of the non-selected input fields to a retrievable archive, wherein the retrievable archive is available separately for each group;
   arranging the selected input fields by at least one group, wherein each of the selected input fields each correspond with at most one group at a time;
   arranging the at least one group for display on the UCUI;
   displaying the UCUI, wherein the UCUI displays at least the at least one group and the corresponding selected input fields;
   entering an edit mode to edit the UCUI and editing any of the at least one group by the user, wherein editing any of the at least one group comprises:
      adding a new group that includes naming the new group, and displaying the new group on the UCUI;
      repositioning one of the displayed groups on the UCUI that includes selecting a group bar of one of the displayed groups on the UCUI, and positioning the group bar on the UCUI;
      changing a group name that includes selecting a group name of one of the displayed groups, and entering a new group name;
      deleting one of the displayed groups that includes selecting one of the displayed groups, and deleting the one of the displayed groups and returning any input fields corresponding with the deleted group to the retrievable archive; and
      changing a group color that includes selecting one of the displayed groups, selecting a color for the one of the displayed groups, and applying the color for the one of the displayed groups.

2. The method of claim 1, wherein an original UI in the software application is initially non-configurable.

3. The method of claim 1, wherein an original UI in the software application is initially partially configurable.

4. The method of claim 1, wherein the software application is selected from the group consisting of: a database application, a word processing application, an enterprise application, a customer relationship management (CRM) application, a spreadsheet application, information worker application, educational application, a simulation application, an application suite, a product development application, and an engineering application.

5. The method of claim 1, wherein the editing any of the plurality of input fields by the user comprises:
   adding one of the plurality of input fields to the UCUI, wherein adding one of the plurality of input fields to the UCUI includes,
      displaying the retrievable archive,
      selecting any of the non-selected input fields for display on the UCUI, a positioning the selected input field on the UCUI; deleting one of the displayed input fields on the UCUI, wherein deleting one of the displayed input fields on the UCUI includes,
   selecting one of the plurality of displayed input fields for deletion,
   moving the selected input field to the retrievable archive, and
   displaying the retrievable archive showing the deleted input field; and
   repositioning one of the displayed input fields on the UCUI, wherein repositioning one of the displayed input fields on the UCUI includes,
   selecting one of the plurality of displayed input fields for repositioning, and
   positioning the selected input field on the UCUI.

6. The method of claim 5, wherein positioning the selected input field on the UCUI comprises:
   dragging and dropping the selected input field to a desired location on the UCUI;
   if the desired location is atop a displayed input field, replacing the displayed input field with the selected input field and moving the displayed input field along side of the selected input field;
   if the desired location is atop a group header, positioning the selected input field to a first position in the group;
   if the desired location is outside a group, positioning the selected input field in a nearest group; and
   if the desired location is inside a group, positioning the selected input field in a last position in the group.

7. The method of claim 1, wherein when the user configures the UCUI, a configuration is stored, and wherein any of a plurality of configurations may be stored.

8. A computer device program product for providing a user with a user configurable user interface (UCUI) for a software application using an electronic computing device, the computer device program product comprising:
   a non-transitory computer readable medium;
   first programmatic instructions for causing the electronic computing device to receive a plurality of input fields corresponding with the UCUI from the software application;
   second programmatic instructions for selecting any of the plurality of input fields for display on the UCUI;
   third programmatic instructions for arranging the selected input fields by at least one group, wherein each of the selected input fields each correspond with at most one group at a time;
   fourth programmatic instructions for arranging the at least one group for display on the UCUI;
   fifth programmatic instructions for displaying the UCUI, wherein the UCUI displays at least the at least one group and the corresponding selected input fields, wherein the programmatic instructions are stored on the non-transitory computer readable medium;
   sixth programmatic instructions for moving all of the non-selected input fields to a retrievable archive, wherein the retrievable archive is available separately for each group;
   seventh programmatic instructions for entering an edit mode to edit the UCUI;
   eighth programmatic instructions for editing any of the plurality of input fields by the user; and
   ninth programmatic instructions for editing any of the at least one group by the user comprising:

adding a new group that includes naming the new group, and displaying the new group on the UCUI;
repositioning one of the displayed groups on the UCUI that includes selecting a group bar of one of the displayed groups on the UCUI, and positioning the group bar on the UCUI;
changing a group name that includes, selecting a group name of one of the displayed groups, and entering a new group name;
deleting one of the displayed groups that includes selecting one of the displayed groups, and deleting the one of the displayed groups, wherein deleting the one of the displayed groups returns any input fields corresponding with the deleted group to the retrievable archive; and
changing a group color that includes selecting one of the displayed groups, selecting a color for the one of the displayed groups, and applying the color for the one of the displayed groups.

9. The computer device program product of claim 8, wherein an original UI in the software application is initially non-configurable.

10. The computer device program product of claim 8, wherein an original UI in the software application is initially partially configurable.

11. The computer device program product of claim 8, wherein the software application is selected from the group consisting of: a database application, a word processing application, an enterprise application, a customer relationship management (CRM) application, a spreadsheet application, information worker application, educational application, a simulation application, an application suite, a product development application, and an engineering application.

12. The computer device program product of claim 8, wherein the eighth programmatic instructions for editing any of the plurality of input fields by the user comprises:
adding one of the plurality of input fields to the UCUI, wherein adding one of the plurality of input fields to the UCUI includes,
displaying the retrievable archive,
selecting any of the non-selected input fields for display on the UCUI, and
positioning the selected input field on the UCUI;
deleting one of the displayed input fields on the UCUI, wherein deleting one of the displayed input fields on the UCUI includes,
selecting one of the plurality of displayed input fields for deletion,
moving the selected input field to the retrievable archive, and
displaying the retrievable archive showing the deleted input field; and
repositioning one of the displayed input fields on the UCUI, wherein repositioning one of the displayed input fields on the UCUI includes,
selecting one of the plurality of displayed input fields for repositioning, and positioning the selected input field on the UCUI.

13. The computer device program product of claim 12, wherein positioning the selected input field on the UCUI comprises:
dragging and dropping the selected input field to a desired location on the UCUI;
if the desired location is atop a displayed input field, replacing the displayed input field with the selected input field and moving the displayed input field along side of the selected input field;
if the desired location is atop a group header, positioning the selected input field to a first position in the group;
if the desired location is outside a group, positioning the selected input field in a nearest group; and
if the desired location is inside a group, positioning the selected input field in a last position in the group.

14. The computer device program product of claim 8, wherein when the user configures the UCUI, a configuration is stored, and wherein any of a plurality of configurations may be stored.

15. A method for providing a user with a user configurable user interface (UCUI) for a software application using an electronic computing device, the method comprising:
causing the electronic computing device to receive a plurality of input fields corresponding with the UCUI from the software application;
selecting any of the plurality of input fields for display on the UCUI;
moving all of the non-selected input fields to a retrievable archive, wherein the retrievable archive is available separately for each group;
arranging the selected input fields by at least one group, wherein each of the selected input fields each correspond with at most one group at a time;
arranging the at least one group for display on the UCUI;
displaying the UCUI, wherein the UCUI displays at least the at least one group and the corresponding selected input fields; and
editing any of the at least one group by the user by adding a new group, repositioning one of the displayed groups on the UCUI, changing a group name, deleting one of the displayed groups, and changing a group color.

16. The method of claim 15, wherein:
adding a new group comprises:
naming the new group, and
displaying the new group on the UCUI;
repositioning one of the displayed groups on the UCUI comprises:
selecting a group bar of one of the displayed groups on the UCUI, and
positioning the group bar on the UCUI;
changing a group name comprises:
selecting a group name of one of the displayed groups, and
entering a new group name;
deleting one of the displayed groups comprises:
selecting one of the displayed groups, and
deleting the one of the displayed groups and returning any input fields corresponding with the deleted group to the retrievable archive; and
changing the group color comprises:
selecting one of the displayed groups,
selecting a color for the one of the displayed groups, and
applying the color for the one of the displayed groups.

17. The method of claim 15, further comprising:
providing one or more other users with the UCUI that includes the selected input fields and groups as edited and arranged for display to the user.

18. A method for providing a user with a user configurable user interface (UCUI) for a software application using an electronic computing device, the method comprising:
causing the electronic computing device to receive a plurality of input fields corresponding with the UCUI from the software application;
selecting any of the plurality of input fields for display on the UCUI;

arranging the selected input fields by at least one group, wherein each of the selected input fields each correspond with at most one group at a time;

arranging the at least one group for display on the UCUI;

displaying the UCUI, wherein the UCUI displays at least the at least one group and the corresponding selected input fields;

providing one or more other users with the UCUI that includes the selected input fields and groups as arranged for display to the user; and editing any of the at least one group by the user by adding a new group, repositioning one of the displayed groups on the UCUI, changing a group name, deleting one of the displayed groups, and changing a group color.

* * * * *